(12) United States Patent
Yializis

(10) Patent No.: US 10,102,974 B2
(45) Date of Patent: Oct. 16, 2018

(54) POLYMERIC MONOLITHIC CAPACITOR

(71) Applicant: SIGMA TECHNOLOGIES INT'L., LLC, Tucson, AZ (US)

(72) Inventor: Angelo Yializis, Tucson, AZ (US)

(73) Assignee: SIGMA TECHNOLOGIES INT'L., LLC, Tucson, AZ (US)

( * ) Notice: Subject to any disclaimer, the term of this patent is extended or adjusted under 35 U.S.C. 154(b) by 0 days.

(21) Appl. No.: 15/625,282

(22) Filed: Jun. 16, 2017

(65) Prior Publication Data

US 2017/0301465 A1    Oct. 19, 2017

Related U.S. Application Data

(63) Continuation-in-part of application No. 15/483,780, filed on Apr. 10, 2017, and a continuation of application No. 14/668,787, filed on Mar. 25, 2015, now Pat. No. 9,711,286.

(51) Int. Cl.
| | |
|---|---|
| *H01G 4/30* | (2006.01) |
| *H01G 4/06* | (2006.01) |
| *H01G 4/08* | (2006.01) |
| *H01G 4/005* | (2006.01) |
| *H01G 4/12* | (2006.01) |

(52) U.S. Cl.
CPC ............ *H01G 4/129* (2013.01); *H01G 4/304* (2013.01)

(58) Field of Classification Search
CPC .. H01G 4/12; H01G 4/30; H01G 4/33; H01G 4/129; H01G 4/304

USPC .......... 361/301.4, 321.1, 326, 311, 303, 323
See application file for complete search history.

(56) References Cited

U.S. PATENT DOCUMENTS

| | | |
|---|---|---|
| 4,954,371 A | 9/1990 | Yializis |
| 5,018,048 A | 5/1991 | Shaw et al. |
| 5,097,800 A | 3/1992 | Shaw et al. |
| 5,716,532 A | 2/1998 | Yializis et al. |
| 5,731,948 A | 3/1998 | Yializis et al. |
| 6,092,269 A | 7/2000 | Yializis |
| 6,165,832 A | 12/2000 | Honda et al. |
| 2014/0347780 A1* | 11/2014 | Takeoka ................. H01G 4/015 361/275.4 |

* cited by examiner

*Primary Examiner* — Eric Thomas
*Assistant Examiner* — Arun Ramaswamy
(74) *Attorney, Agent, or Firm* — Yakov S. Sidorin; Quarles & Brady LLP

(57) ABSTRACT

Prismatic polymer monolithic capacitor structure including multiple interleaving radiation-cured polymer dielectric layers and metal layers. Method for fabrication of same. The chemical composition of polymer dielectric and the electrode resistivity parameters are chosen to maximize the capacitor self-healing properties and energy density, and to assure the stability of the capacitance and dissipation factor over the operating temperature range. The glass transition temperature of the polymer dielectric is specifically chosen to avoid mechanical relaxation from occurring in the operating temperature range, which prevents high moisture permeation into the structure (which can lead to higher dissipation factor and electrode corrosion). The geometry and shape of the capacitor are appropriately controlled to minimize losses when the capacitor is exposed to pulse and alternating currents.

32 Claims, 7 Drawing Sheets

POLYMERIC MONOLITHIC CAPACITOR

CROSS-REFERENCE TO RELATED APPLICATIONS

This application is a continuation-in-part from the U.S. patent application Ser. No. 14/668,787 filed on Mar. 25, 2015 and now published as US 2016/0284472, and a continuation-in-part from the U.S. patent application Ser. No. 15/483,780 filed on Apr. 10, 2017, which in turn is a continuation of U.S. patent application Ser. No. 14/668,787. The disclosure of each of the above-mentioned applications is incorporated by reference herein.

TECHNICAL FIELD

The present invention relates generally to polymeric monolithic capacitors and, in particular, to capacitors configured to have polymer dielectric formulation and metal electrodes configured to maximize the capacitor self-healing properties, maximize capacitor energy density, and minimize breakdown failures, while at the same time maintaining high pulse and ripple current carrying capacity of the capacitor.

BACKGROUND

The polymeric monolithic capacitor (PMC) has a polymer dielectric and metallized electrodes and is a structure generally similar to that of a metallized film capacitor (MFC), with the notable exception that metallized film capacitor is produced by winding or stacking a metallized film. As a result of the corresponding process of manufacture, an MFC does not possess a monolithic structure, because it is produced in atmospheric conditions and includes air-filled micro-gaps between the constituent layers. Furthermore, metallized films have a minimum thickness, which is determined by the polymer chemistry, the process of manufacture and the fact such films must be strong enough to be handled during the manufacturing process, metallization, slitting into bobbins and winding into a capacitor.

In stark contradistinction to the MFC, the PMC capacitor is produced in the vacuum by forming thousands of polymer dielectric layers and metallized electrode layers in a single process step. The lack of air between the layers and inter-layer bonding turns the resulting structure into a substantially monolithic structure. The individual polymer dielectric layers of this structure are pinhole free, and the overall structure is not touched or brought in contact with anything or exposed to air during the process of manufacture until and after a stack of thousands of polymer/metal layers has been already formed (including protective layers on the bottom and top surface of the stack). As a result, the polymer dielectric layers of the PMC structure can be formed to be as much as 100 times thinner that common polymer film dielectrics. This advantage, combined with a wide range of physical and dielectric properties of the PMC structure, results in volumetrically efficient capacitors that can be used in applications that are traditionally served by other capacitor technologies (such as, for example, MFCs, electrolytic and Ceramic Multilayer Capacitors (MLCs).

Applications that involve operation at high temperatures, high ripple current, high voltage and current pulses, and high energy density, are currently served by capacitors fabricated with various technologies including MFCs, aluminum and tantalum electrolytic capacitors, and MLCs. For example, MFCs are used extensively in a broad range of electrical and electronic equipment. In order to reduce the dimensions of an MFC—an ever-popular task—the thickness of the polymer film layer(s) of such capacitor should be reduced. The degree to which the reduction of the thickness of the polymer film (such as, for example, a polypropylene (PP) film) can be achieved is limited by the film-manufacturing process, and the resulting thickness of PP films is typically no less than about two microns. This limits the voltage at which such film capacitor can be used to about 300 VDC. Therefore for a low voltage application—for example the one requiring 25 V, that requires a capacitor with the high quality properties of PP film, the use of a PP MFC is prohibitive due to its large size and high cost. Such low voltage applications will typically be serviced with aluminum electrolytic capacitors when the applications require high capacitance, and MLCs when the applications require lower capacitance values. PMC capacitors with submicron polymer dielectrics are small and can be used to replace both aluminum electrolytics and MLCs, with the added benefit of the stable polymer dielectric properties.

Applications such as those employing DC-links (for example, used in inverters for hybrid and electric vehicles) utilize metallized PP film capacitors to minimize ripple current, voltage fluctuations, and to suppress transient effects. Key characteristics of such DC-link capacitors used in voltage-sourced inverters of electric drive vehicles include self-healing properties to assure a benign failure mode, withstanding high ripple currents, low dissipation factor (DF), high capacitance, and high operating temperature. The list of these requirements effectively excludes the use of electrolytic capacitors and MLCs. Metallized PP capacitors that are almost exclusively used in such DC-link applications, have an operating temperature limited to 105° C. with significant derating in voltage, ripple current and capacitor lifetime, and such capacitors are relatively large and costly. Therefore, there remains a need—at least in the automotive industry—to reduce the DC-link capacitor size and to extend the capacitor's upper operating temperature to at least 125° C. and preferably as high as 140° C.

Yet another group of applications in which the capacitors play a critical part in the final product is pulse power systems that deliver a pulse of energy in a short time period. Here, the search for smaller and better-performing capacitors remains ongoing. Examples of such applications include implantable defibrillators and a multitude of defense applications where size and weight are critical capacitor parameters. For example, in an implantable defibrillator, the capacitor occupies about 50% of the defibrillator volume and the aluminum and tantalum electrolytic capacitors that are currently used in this application can weigh more than all the other defibrillator components combined. At another extreme, a metallized PP capacitor bank used to fire a rail gun that could potentially be used in a tank, is currently larger than the tank itself. Therefore, there in a need to develop new capacitor technologies to maximize operating temperature, to handle higher ripple and pulse currents, and to reduce the capacitor weight and volume, while improving capacitor lifetime and reliability.

BRIEF DESCRIPTION OF THE DRAWINGS

The disclosure presented in the Detailed Description section of the present application will be better understood in conjunction with the following generally not-to-scale Drawings, of which.

DETAILED DESCRIPTION

Figure 1A:
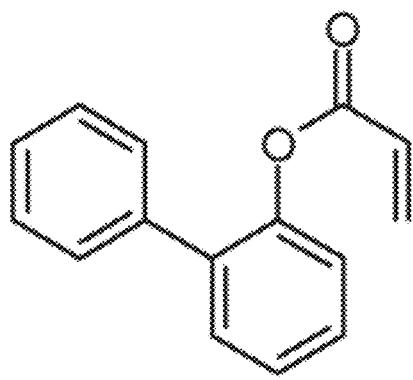
FIGS. 1A and 1B provide schematic diagrams of two monomer chains.

This invention is directed at fabrication of polymer monolithic capacitors possessing self-healing properties that prevent catastrophic failure of a capacitor and result only in a benign failure mode, high temperature stability, resistance to degradation in high-temperature and high-humidity environments, and ability to handle high ripple currents, which present a unique set of properties demanded from the polymer monolithic capacitors by, for example, the automotive inverter applications.

The term "polymer monolithic capacitor" (PMC) is used to describe a capacitor that originates as a multilayer composite or a "mother capacitor" material produced around a rotating process drum with thousands of polymer dielectric and electrode layers. The mother capacitor material is removed from the drum and is processed into individual capacitors, via a series of process steps that include pressing the mother capacitor material, segmentation into individual capacitors, etching of the electrodes at the cut edges to prevent flashover and termination steps that include plasma ashing of the polymer at the termination edge to reveal the aluminum electrodes and arc spraying a metal over the exposed aluminum electrodes to connect the thousands of electrode layers and form a capacitor with two sets of electrodes.

The terms "polymer dielectric" and "polymer dielectric layers" may be used interchangeably to describe a layer of polymer, which is produced by flash evaporation of a radiation-curable monomer material that is vaporized and condensed on a rotating drum, and then cured with electron beam or UV radiation.

The terms "cure", "polymerization" and "cross-linking" may be used interchangeably to refer to the process by which a condensed monomer material is converted into a polymer dielectric material.

The terms "metal electrodes" and "aluminum electrodes" may be used interchangeably to define the polymer monolithic capacitor electrodes, of which aluminum electrodes are but one example.

The term "electrode passivation" means that the metal electrodes (and aluminum metal electrodes) are exposed to an oxygen-containing plasma immediately after their deposition to form an oxide layer thereon such an $Al_2O_3$ oxide layer, which is the most stable and corrosion resistant aluminum oxide. If not passivated in this manner then, when the multilayer capacitor is exposed to humidity, a hydrated aluminum oxide is formed ($Al_2O_3.(H_2O)$), which is not as protective as $Al_2O_3$, thereby leading to rapid electrode corrosion.

The terms "heavy edge" and "heavy electrode edge" are used to describe a section of the capacitor electrode, located outside the active capacitor area, that is made thicker than an active electrode of the capacitor to facilitate a lower resistance contact with a coating (such as an arc spray coating, for example) that connects the individual electrode layers together.

The terms "self-healing", "self-healing event" and "clearing" may be used interchangeably, in reference to MFCs, to denote a process occurring during a breakdown of the capacitor's dielectric, as a result of which the electrical short between the two electrodes causes a current flow that melts the thin metal electrodes around the location of the short (like a fuse), thereby isolating the location of the fault, protecting the capacitor component from being destroyed by the dielectric breakdown, and allowing the capacitor to operate with virtually an insignificant amount of capacitance loss.

The terms "plasma ashing" and "plasma etch" refer to a process where a polymer material in the presence of an oxidative plasma is "ashed" or burned away as a result of conversion of the polymer material into low molecular weight gaseous products. This process is used to remove polymer at the edges of the monolithic capacitors to expose the metal electrodes so that the electrodes can be shorted together with an appropriate coating to form a capacitor termination.

The terms "stable capacitor operation", "stable capacitance", and "stable dissipation factor" are used to define a capacitor in which no sudden changes of capacitance or dissipation factor occur in the operating temperature range of the capacitor, and especially at higher temperatures. For example, a capacitor designed to operate at 125° C. or higher is considered to have stable capacitance if the capacitance is not reduced by more than 10% and/or not increased by more than 20% at the maximum operating temperature from that at 25° C. Similarly, the dissipation factor of a stable capacitor (a stable dissipation factor) at the maximum operating temperature can be lower than that at 25° C., but it does not increase more than about 20% at the maximum operating temperature.

The idea of the present invention stems from the realization that specific solutions to shortcomings in operational characteristics of existing capacitor structures can be achieved through unique combinations of the chemical structure of the polymer dielectric material, its physical properties, constrains in the thickness and resistivity of the metallized electrodes, treatment of the electrodes and choosing specific capacitor shapes that enhance electrical performance.

In particular, the answer to the problem of widening a temperature range of operation of the PMC and achieving the stable operation at temperatures as least as high as 125° C. or higher (for example, 140° C.) is provided by devising a polymer dielectric material the properties of which ensure that the DF of the capacitor is stable throughout the operating temperature range by selecting a polymer dielectric that has a glass transition temperature $T_g$ that is higher than the maximum operating temperature. It was discovered that if the $T_g$ of a polymer is between 25° C. and the maximum operating temperature, then at the Tg the dissipation factor of most radiation-cured polymers is increased. Furthermore, above the Tg the polymer absorbs moisture which has detrimental effects both on the dissipation factor and electrode corrosion. Accordingly, the problem of increasing the range of operating temperatures across which the dissipation factor remains stable is addressed, by the present invention, by formulating a polymer dielectric material with Tg that is significantly higher than the maximum operating temperature.

In addition to satisfying the Tg condition, the capacitor of choice must have the ability to self-heal in the event that a breakdown occurs. A problem of maximizing the self-healing properties of a PMC was solved by devising the chemistry of the polymer dielectric material in which the carbon in the polymer is effectively removed in the form of gases (such as $CO$, $CO_2$, $CH_4$, and $C_2H_6$, for example). Specifically, an effective carbon removal process has been shown possible if the monomer materials used to produce the polymer dielectric have an average hydrogen-to-carbon ratio in excess of 1 and an oxygen-to-carbon ratio in excess of 0.1.

For high temperature and high current applications, another condition that needs to be satisfied is high corrosion resistance of the capacitor electrodes, especially if the electrode comprises aluminum. Generally, an aluminum electrode (when exposed to high temperature and DC voltage in the presence of humidity) undergoes an electrochemical corrosion that reduces the area of the electrode and increases its resistivity. This problem is addressed, at least in part, by passivating the aluminum layers of the PMC structure of the current invention in line with deposition of these layers. It was discovered that in addition to conventional electrode passivation by exposure to a plasma, post baking of the mother capacitor material to temperatures, in the range of 200° C. to 280° C., also resulted in electrode passivation. The latter form of passivation is possible by creating organometallic bonds between the aluminum electrodes and polymer dielectric. Acrylate polymers formed by radiation curing contain certain percent of uncured monomer in the polymer lattice as well a small percent of acrylic acid and monomer that has undergone random scission. It was discovered that at high temperatures such functional monomer groups react with the aluminum electrodes, thereby preventing access of the aluminum by moisture.

Yet another condition that needs to be satisfied for high temperature operation of the capacitor of choice is the reduction of the heating losses in the capacitor. Current metallized film capacitors used in inverter applications can fail when high temperature operation is combined with high ripple current, causing heating due dissipation of power in the resistance of the electrodes. A problem of minimization of the power loss in the PMC is solved by judiciously structuring the capacitor such that a termination edge thereof is defined at the long edge surface of the PMC. In doing so, the mechanical strength of the termination edge of the PMC structured according to an embodiment of the invention is additionally increased by shaping the area of termination of the electrode layers as a heavy edge with the use of an appropriate metallic coating bonded at least to the electrode layers at the terminating surface(s) of the PMC.

Self-Healing

According to one embodiment of the invention, the specific chemistries of monomer materials used to produce the polymer dielectric layer(s) are chosen to facilitate the capacitor self-healing process. In implementing the idea of the invention, PMCs were produced using a wide range of radiation-curable materials that included monomers incorporating carbon-to-carbon double bonds that brake with radiation, to cause the polymer dielectric to cross-link. In one example, such chemistries included acrylate monomers that are cured using electron beam and UV radiation. By choosing an acrylate chemistry that has high H:C and O:C atomic ratios, the self-healing properties were improved by aiding the formation of $Al_2O_3$, $CO$, $CO_2$, $CH_3$, $C_2H_6$ and other hydrocarbon gases that remove Al and C from the site of a breakdown of the carbon-to-carbon double bonds. The elimination of Al and C from the surface of the polymer layer as the electrodes melt back (or fuse), leads to a rapid, quick fusing action, during which a relatively small amount of current was dumped into the failure site. Such process minimizes the damage caused by the electrical short between the electrodes, thereby allowing the voltage across the capacitor electrodes to recover with minimum or no leakage current flow through the damaged dielectric layer. Indeed, in the alternative—when the surface of the polymer continues to hold a high level of carbon thereon (that is, remains "carbonized")—the fusing action will be slowed down, which leads to a greater amount energy to be disposed at the failure site in a unit of time, causing additional breakdowns of adjacent dielectric layers. If not interrupted, this process can lead to a thermal runaway failure of the capacitor. While in most cases the capacitor does not necessarily fail as a result of such failure, it nevertheless loses a significant amount of capacitance. Furthermore, if carbon is not removed adequately from the polymer surface it causes excessive leakage current that compromises the capacitor performance.

Example 1

Figure 1B:
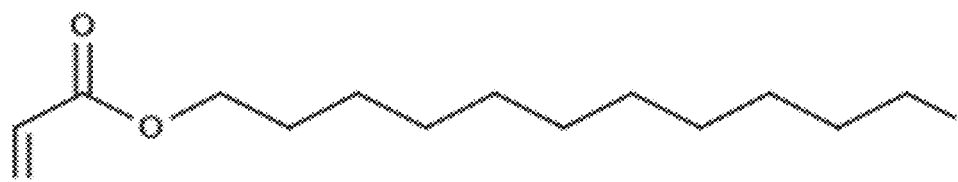

In order to compare the self-healing properties of the PMCs made with polymers having different chemical compositions, a test was performed to determine at least a leakage current through the capacitor after a large number of self-healing events. Initially, a mother capacitor material (with an area of 10 square feet) containing 2000 active capacitor layers was produced with different polymer dielectric materials, but keeping the same dielectric thickness (0.65 micrometer) and electrode resistivity (25 Ohms/square). Individual chips (each with an area of 500 $mm^2$) were segmented from the mother capacitor material and processed into capacitors. Depending on the dielectric constant, the capacitors had a capacitance in the range of 30-35 μF. At least 50-80 capacitors from every batch were exposed to a DC voltage of 300 V or greater. Exposure of such thin polymer dielectrics to voltages equal to or exceeding 300 VDC caused clearings of weak spots or defects in the capacitor's dielectric material. After exposure to the DC voltage, various capacitor parameters were measured, including capacitance, dissipation factor, equivalent series resistance (ESR), and leakage current. Capacitors with polymer dielectrics that have acceptable self-healing properties had a leakage current of less than 1 μA. Capacitors with a polymer dielectric that did not have acceptable self-healing properties, had a leakage current exceeding 50 μA. It was empirically determined that the chemistry of the radiation-curable monomers had a significant impact on leakage current generated by the self-healing events and, ultimately, on the maximum voltage that could be applied to the capacitor before the catastrophic failure occurred. For example, a capacitor with a polymer dielectric comprising 2-phenyl-phenyl acrylate (the chain for which is shown schematically in FIG. 1A) demonstrated poor self-healing properties, in stark contradistinction with a capacitor structured with the use of monomer comprising a dodecane acrylate polymer dielectric material, which also has twelve carbons in an aliphatic chain (see FIG. 1B).

The 2-phenyl-phenyl acrylate has a hydrogen-to-carbon ratio of H:C=0.8 and an oxygen-to-carbon ratio O:C of 0.13, while the dodecane acrylate is characterized by H:C=1.86 and an O:C=0.14. In general, we found that, in order for a PMC capacitor designed for a high temperature application to withstand maximum voltage with minimal degradation, it is necessary for the monomer molecules or mixture of monomers used for formation of the polymer dielectric material of such capacitor to have a hydrogen-to-carbon ratio H:C>1 and an oxygen-to-carbon ratio O:C>0.1 and, preferably, H:C>1.2 and O:C>0.1. While it was recognized that the presence of other atoms that can lead to formation of gaseous products capable of removing carbon from the polymer surface (such as nitrogen and fluorine, for example) was also beneficial, not many related embodiments of monomers were evaluated to develop a criterion.

A parameter that is equally critical for maximization of self-healing properties is the thickness of the metallized capacitor electrodes (which for many applications comprise thin metallized aluminum layers). Since thickness measurements are extremely difficult to conduct on nanometer-size metal layers, the thickness of the aluminum electrodes is quantified by their electrical conductivity or surface resistivity, measured in ohm per square. This correlation works well for electrodes that include highly conductive low-melting point metals (such as aluminum, aluminum alloys), two-layer electrodes (such as aluminum/zinc, aluminum/copper, zinc/silver, and others). It was empirically found that, in addition to selecting polymers that have the proper H:C and O:C ratios, the resistivity of the metallized electrodes needs to be within a judiciously defined range in order to maximize the self-healing properties. Such choice of resistivity translates, in practice, into a lower electrode thickness with a heavy electrode edge (the aluminum layer is thicker outside the active capacitor area), to assure good electrical contact without impacting the capacitor self-healing properties.

It should also be noted that the better the self-healing properties the higher the voltage (V) that can be applied to the capacitor without causing a catastrophic failure. Therefore, the greater the capacitor energy density—for a given capacitance C, the capacitor energy is determined as $\frac{1}{2}*C*V^2$. Experimentation indicated that in conventional wound capacitors air-filled micro-gaps contribute to the formation of the $Al_2O_3$ as well as to the removal of carbon in the form of CO and $CO_2$, which aids the self-healing process. PMCs have no air gaps, therefore in order to maximize the self-healing properties, in addition to oxygen supplied by the polymer (as described above), the electrode resistance value needs to be greater than resistance values of the conventional wound film capacitors. However, with increase of the electrode resistance the capacitor Equivalent Series Resistance (ESR) increases which increases the capacitor loss in the form of heat dissipated in the electrodes ($I^2R$ where R=ESR) also increases. It was determined that, for a high ripple current application where the continuous current is high, the maximum value of sheet resistance should be limited to less than 100 Ohm/square to minimize losses and to maintain a dissipation factor smaller than about 0.02. This range, however, is not the case for low repetition rate high pulse voltage/current applications that have lower average continuous current. For these applications, according to an embodiment of the invention, we found that PMCs can have electrodes with sheet resistance values as high as 500 Ohm/square and dissipation factors greater than 0.02. In order to avoid high ESR that can result in high capacitance losses, the high electrode resistivity is counteracted by using thousands of electrodes in parallel and choosing a capacitor shape that limits the distance that the current has to travel to charge the capacitor. In this manner, the higher electrode resistivity maximizes the self-healing process, which in turn increases the breakdown voltage and energy density of the PMC capacitor, thereby resulting in a smaller capacitor volume and weight.

Example 2

PMC capacitors designed for a high current DC-link application (with 60,000 layers having a polymer dielectric chemical structure characterized by a hydrogen-to-carbon ratio of greater than 1.0 and an oxygen-to-carbon ratio greater than 0.1, glass transition temperature Tg>100° C., dielectric thickness 0.6 µm, and aluminum based electrodes with a sheet resistance of 30-40 Ohm/square in the active capacitor area and less than 5 Ohm/square in the area of the heavy edge, yielded parts with dissipation factor smaller than 0.02 and a breakdown strength corresponding to breakdown voltage of less than 250 V. Three of such capacitors connected in series (internally) were used to produce a 500 µF/600V capacitor systems which were approximately three times smaller than state of the art PP capacitors with lower ESR (that is, lower $I^2R$ heating losses). At the same time, the operating temperature of the so-produced PMC capacitor system was 140° C. versus 105° C. for conventionally-used PP capacitors. This evidenced a dramatic improvement in energy density and reliability of the capacitors configured according to an embodiment of the invention for demanding automotive applications, which, in turn, also translates to and results in smaller and more efficient and lower cost inverters.

Example 3

In another example, PMC capacitors with the same dielectric material and thickness as those discussed above and including the same number of layers, were designed for high energy density pulse voltage applications and produced with electrodes that had sheet resistance of approximately 200 Ohm/square in the active capacitor area and less that 10 Ohm/square in the area of the heavy edge. Such design yielded parts with dissipation factor >0.02 at 25° C. and a breakdown strength exceeding 550 V. Considering that the energy density of the capacitor varies as the square of the voltage, PMC capacitors with the higher resistivity electrodes, as discussed, are characterized with energy density that is about four times higher than PMC capacitors with the same dielectric thickness but lower resistivity electrodes. In fact, the energy density of the active capacitor area in these samples had a record value for a full-size polymer capacitor of 9.5 J/cc (assuming a maximum voltage of 500 V). A person of skill in the art will readily recognized that such operational parameters are not expected, are truly remarkable and attributed to the combination of a polymer dielectric (with chemical composition favorable to perpetuate self-sealing properties), a metallized electrode designed to maximize the capacitor self-healing properties, and a heavy edge electrode that allows for a reliable high current contact.

Example 4

In another example, a 18,000 layer capacitor was produced using the same polymer dielectric chemistry as that disclosed in Examples 2 and 3, but with a polymeric layer thickness of 0.2 microns, designed for lower voltage applications. We found that at lower voltages—typically in the range from about 12 VDC to about 48 VDC, the electrode resistance in the active capacitor area becomes an even more critical parameter. This is because when a breakdown occurs, a significant amount of energy is required to melt and vaporize the electrode material in order for the capacitor to self-heal. This required energy is supplied by the capacitor itself as it discharges into the short, and is proportional to the square of the voltage at which the capacitor is charged. At lower voltages, a condition can be found where the capacitor cannot efficiently self-heal if forced to undergo multiple breakdown events, leading to a high resistance short. While an obvious solution to this situation would be to have a dielectric that is thick enough at a given voltage level to avoid multiple self-healing events (and thereby avoiding a short), such solution leads to a larger capacitor with lower energy density. Contrary to such otherwise obvious solution, and in order to maximize the breakdown voltage and energy density, the 18,000 layer capacitor was produced according to an embodiment of the invention to have sheet resistance in the active capacitor area of about 60 to about 80 oOhm/square, instead of 30-40 oOhm/square that would have been used with a 0.6 μm dielectric for a higher voltage application. This solution resulted in a capacitor that could undergo multiple breakdowns without leading to a high resistance short.

In the above Examples 2, 3, and 4, the polymer dielectric had Tg>100° C. For lower temperature applications, the high Tg may be not be necessary as long as the polymer H:C ratio, O:C ratio and electrode resistance criteria are met. Lowering the Tg opens the possibility of varying the polymer chemistry, increasing the number of available polymers (many of which have higher dielectric constants k—for example as high as k=9), that meet the self-healing requirements. The use of such polymers in the capacitor structure(s) at hand, in the related embodiments, can further increase the capacitor energy density. The combination of using higher dielectric constant polymers and meeting the H:C and O:C criteria with electrode sheet resistance values in the range from about 10 Ohm/square to about 100 ohm/square (and more so in the range of 100 ohm/square to 500 ohm/square) was demonstrated to yield PMCs with maximized energy density, as such combination led to the realization of higher energy storage in the dielectric material with maximum self-healing properties of the capacitor structure.

Temperature-Related Parameters

Figure 2:
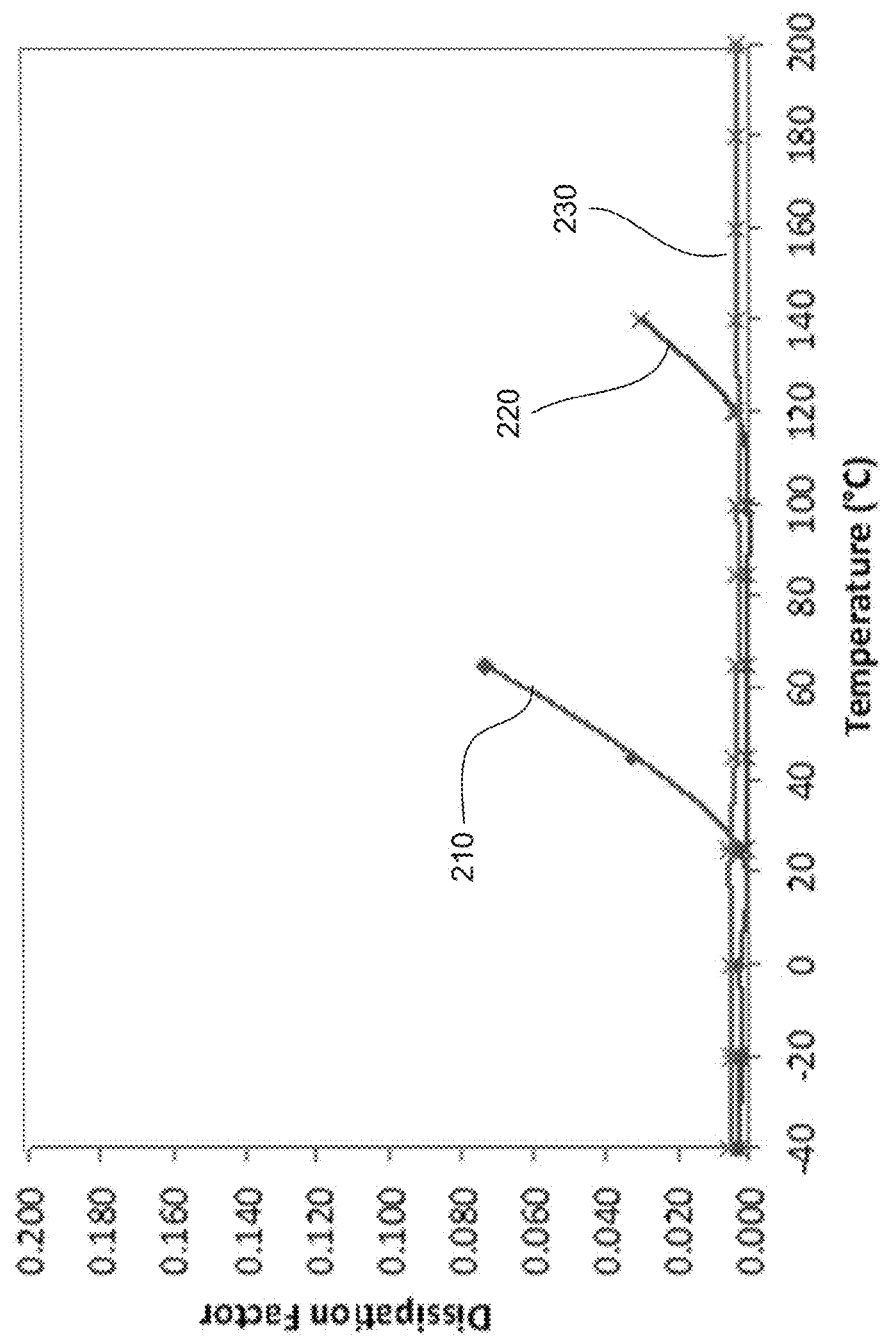
FIG. 2 shows plots representing dependencies of the dissipation factor on temperature for different monolithic polymer capacitors.

In order to address the production of a polymer monolithic capacitor capable of operating reliably at elevated temperatures (up to 125° C. and higher, for example 140 degrees), a behavior of the dielectric loss of the polymer dielectric material was considered. For a stable operation of the PMC it is important that the dissipation factor is stable throughout the desired operating temperature range. The curves 210, 220, and 230 of FIG. 2, show dissipation factors of the three radiation cured polymer dielectrics used to produce the polymer monolithic capacitors according to an embodiment of the invention. These curves demonstrate that the DF of a capacitor can increase at various temperatures based on the chemistry of a particular polymer dielectric material. The DF of a capacitor with a polymer dielectric that includes 4-tert-butylcyclohexyl acrylate, shown by curve 210, increases sharply at about 30° C., while the DF of a capacitor with a polymer dielectric that includes dicyclopentanyl acrylate, shown by curve 220, starts to increase at 120° C. If a capacitor is operated at temperatures where the DF trends upward, the loss will increase the capacitor temperature, which in turn will drive the capacitor to a higher temperature with an even higher DF, which in turn will further increase thermal losses. This process eventually can lead to a thermal runaway failure of the PMC. As a skilled artisan will readily recognize, the data on dissipation factor as a function of temperature for most radiation-cured polymers is either not known or not published. Accordingly, to implement an idea of the present invention, tens of monomers with different monomer formulations were converted into capacitor dielectrics, and measured for DF as a function of temperature up to temperatures of 160° C. and greater. It was unexpectedly determined that for most radiation-cured polymers, the increase in DF coincides with the glass transition temperature (Tg). Unlike the DF, the Tg of many radiation-curable polymers is typically reported by the monomer producers and, therefore, as a result of such empirical determination it was realized that the Tg can be used to select monomers which, when used to form polymer dielectric materials during the process of fabrication of a PMC, can result in a capacitor with a dissipation factors that is substantially the same at elevated temperatures. For example, as shown by curve 230 of FIG. 2, the use of a polymer dielectric material including a mixture of Tricyclodecane Dimethanol Diacrylate and triallyl isocyanurate (both of which have a Tg>200° C.) results in a capacitor with the DF that is stable up to 200° C.

In addition to the DF stability, the value of Tg imposes another limitation on the selection of the polymer dielectric for a PMC. Specifically, it was determined that the use of polymers with lower Tg values leads to absorption of moisture by the capacitor. That is, if the capacitor is operated in ambient conditions of humidity and temperature that is lower than the Tg, the dielectric layers will absorb ambient moisture which, in turn, impacts the stability of capacitance of the PMC. While polymer films such as polypropylene have Tg that is lower than room temperature, they do not absorb water due to the low polarity of the polypropylene chemistry. In comparison, acrylate and other radiation-curable chemistries incorporate higher polarity bonds (such as CO, CN, CF, for example), which may be advantageous because they result in higher polarity chemistry that leads to a higher dielectric constant and, therefore, an increase in energy storage by the resulting PMC. However, the same high polarity chemistry also leads to an increase of-moisture absorption. The moisture absorption is minimal until the Tg is reached. Beyond the Tg temperature, the molecular relaxation that occurs at Tg can dramatically increase moisture absorption.

Figure 3:
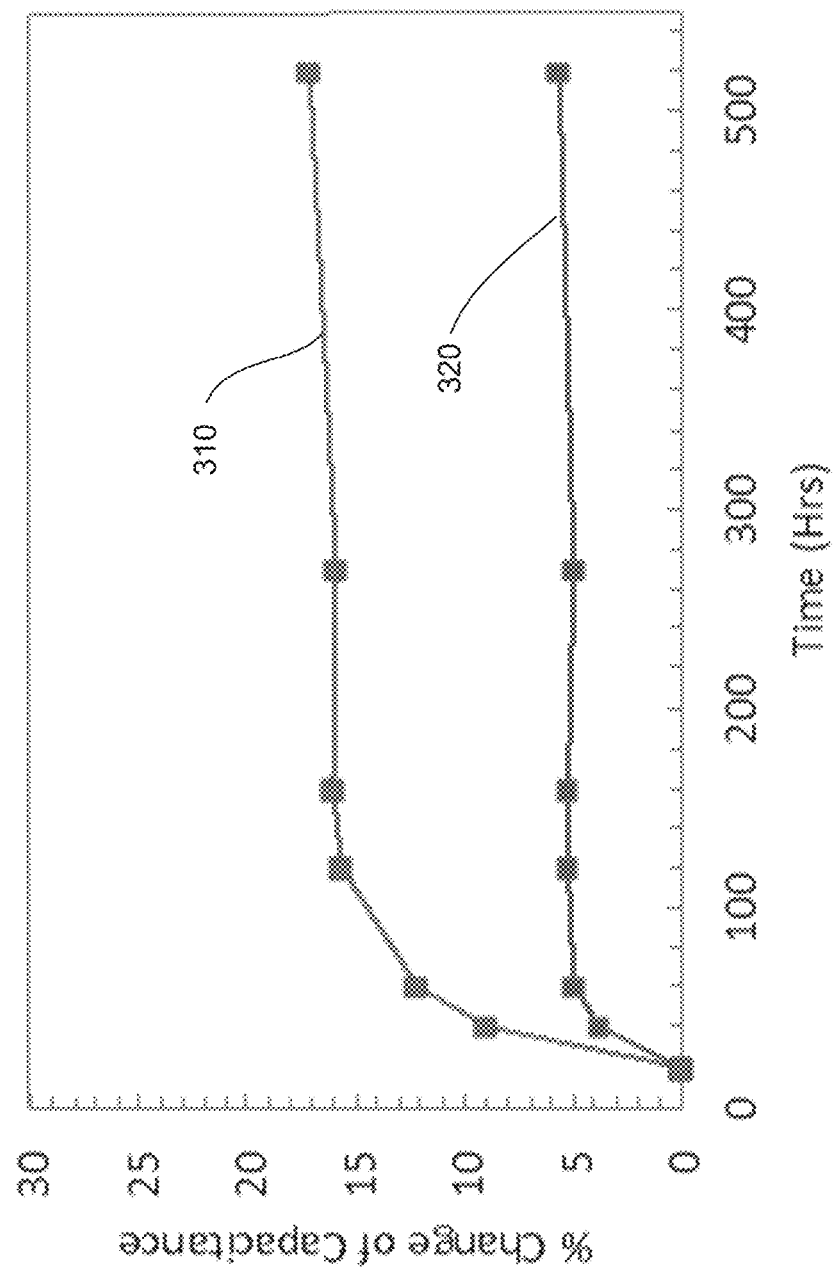
FIG. 3 contains plots representing time-dependent percent change in capacitance of two different monolithic polymer capacitors with time measured in a temperature/humidity test.

The absorption of moisture causes both short-term and long-term reliability issues with the performance of the capacitors performance. Short term the capacitance value increases due to the high dielectric constant of water and longer term the water corrodes the thin capacitor electrodes leading to permanent capacitance loss. This is demonstrated in FIGS. 3 and 4. FIG. 3 depicts plots of percent change in capacitance as a function of time for two types of PMC capacitors. These PMCs have 2000 capacitor layers each but are constructed with two different polymer dielectric materials that have the same dielectric constant k=3.2. Curve 310 of FIG. 3 represents a first polymer dielectric with a $T_{g1}$ of 43° C., while curve 320 represents a second polymer dielectric with a $T_{g2}$ of 100° C. The capacitors were exposed to the ambient environment characterized by 60° C. and 90% relative humidity (RH) for 500 hours without voltage bias, and were intentionally unpackaged to allow the maximum effect of moisture on the capacitor dielectric. Furthermore, small capacitors chips (with areas of about 12 mm²) were used, so that any moisture penetrating into the dielectric layers at the edges of the capacitor would have a more pronounced effect on capacitance. Water has a dielectric constant in the range of k=75 to 80 and, when absorbed by a polymer dielectric with a k of 3.2, it increases the dielectric constant of the polymer dielectric, thereby resulting in an increase of capacitance. As follows from FIG. 3, at a test temperature of 60° C. (which is higher than $T_{g1}$), the value of capacitance of the PMC built with the first polymer dielectric increases significantly and more than that corresponding to the PMC built with the second polymer dielectric.

Figure 4:
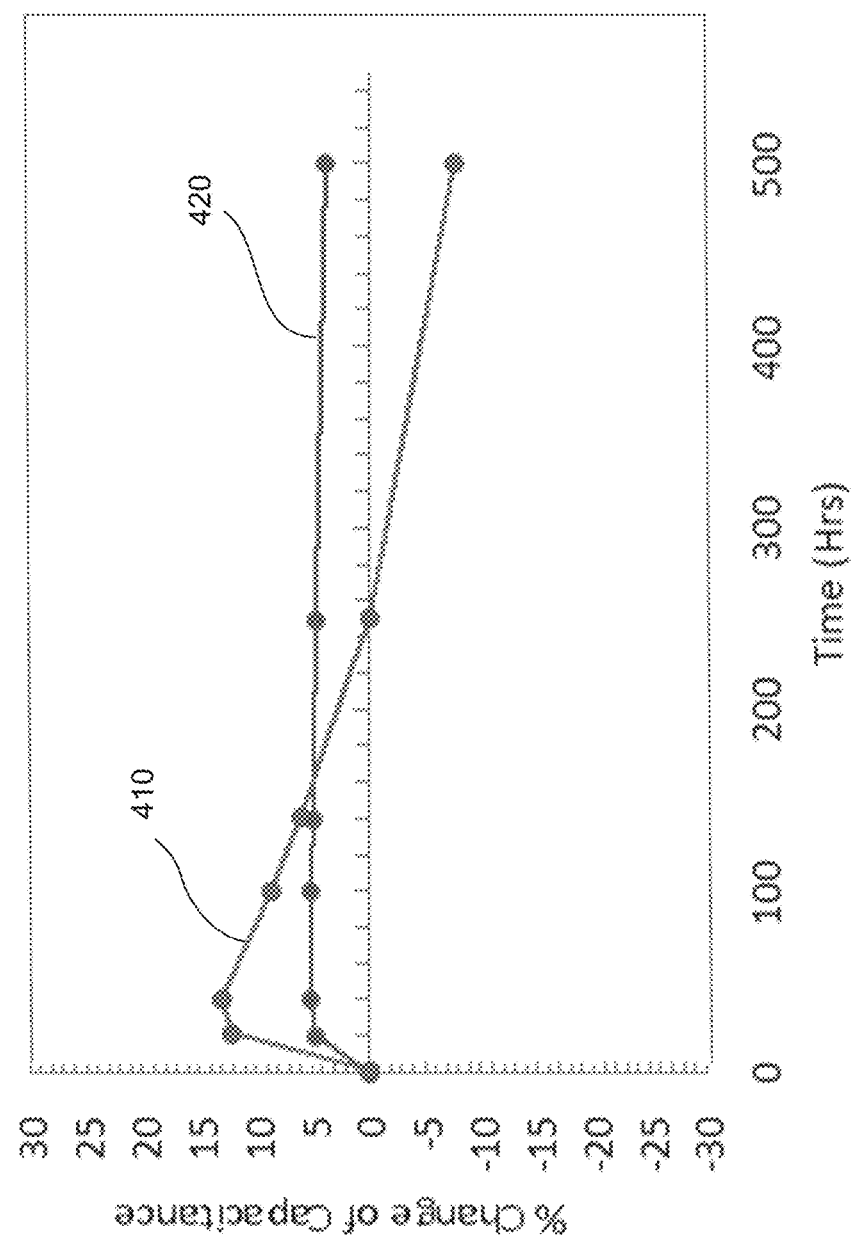
FIG. 4 contains plots representing time-dependent percent change in capacitance of two different monolithic polymer capacitors with time, measured in a temperature/humidity test with DC bias voltage.

As part of the test, capacitors fabricated with the first and second polymer dielectrics were exposed to the same conditions of temperature and humidity but with the addition of DC voltage bias. The illustration of FIG. 4 shows that the first PMC capacitor (employing the dielectric with the lower $T_{g1}$, represented by curve 410) after a relatively short period of time following the beginning of the exposure started to lose capacitance, while the capacitance of the second PMC (utilizing the second polymer dielectric with higher $T_{g2}$, curve 420) remained comparably unchanged. The application of DC voltage triggers a corrosion mechanism in the aluminum metallized capacitor electrodes which reduces the electrode surface area. Therefore, in order to devise a PMC that would perform reliably (in contradistinction with a conventional capacitor that employs a dielectric material such as polypropylene) at extreme temperatures, a radiation-cured dielectric material used to produce a PMC according to an embodiment of the invention should have both a DF that is substantially unchanged across the range of operating temperatures as well as a Tg value that is equal or greater that the desired operating temperature.

Very few radiation-curable monomers were found to result in polymers that combine both low DF and Tg that was higher than 125° C. (which is a target temperature for DC-link capacitors for automotive applications). Most such high Tg monomers have either cycloaliphatic chemistry or they have more than two double bonds. Trifunctional monomers such as tris (2-hydroxy ethyl) isocyanurate triacrylate and triallyl isocyanurate (the behavior of which is represented by curve 230 of FIG. 2) have Tg>125° C. and DF<0.01 that is substantially unchanged up to this temperature. Cycloaliphatic monomers, which include an adamantane (adamantyl) structure resembling that of diamond (such as 2-methyl-2-adamantyl acrylate, 1,3-adamantanediol diacrylate, and tricyclodecane dimethanol diacrylate, for example) also have Tg>125° C. Various formulations of polymers designed to maximize the dielectric constant, self-healing properties, and lower DF can include certain materials that have Tg<125° C. as long as the Tg of the formulated polymer dielectric is greater than 125° C. and preferably greater than 140° C., given that a PMC operating at 125° C. can reach temperatures of 140° C. or even higher due to the presence of high ripple currents and related thermal losses.

At the same time it was discovered that certain monomers that result in highly cross-linked polymer dielectrics (at least two acrylate groups), such as for example hexane diol diacrylate with Tg=41° C., trimethyl propane triacrylate with Tg=62° C., and dimethyl propane tetracrylate with Tg=96° C., also have a stable DF at temperatures exceeding 125° C. due to the molecular weight and crosslinking nature of the monomer. When producing PMC capacitors with such polymer materials we found that when such capacitors were life tested at 125° C. with the application of DC voltage, there was high moisture absorption which rapidly degraded the capacitor properties. Therefore, the measurement of the temperature-dependent behavior of the DF alone is not adequate to determine if a polymer has a Tg that will make it usable for this invention. To determine the Tg of a polymer dielectric material, 2000 layers of polymer only stacks were produced using the same radiation curing conditions as those used to produce a PMC. The complex modulus of the polymer dielectric was then measured as a function of temperature using a Dynamic Mechanical Analysis (DMA) methodology to determine the Tg. Therefore, the process of selecting a monomer formulation that leads to a high performance high temperature polymer dielectric is elaborate and not obvious to someone skilled in the art.

Capacitor Geometry

According to the teachings of the present disclosure, the geometry of a polymer monolithic capacitor is devised such as to reliably service a switching application that combines high ripple currents and high ambient temperatures. The related art teaches that in order to increase the capacitor energy density of polymer monolithic capacitors it is important to have capacitor electrodes with resistivity corresponding to the sheet resistance values in the range of 10 ohms/square to 500 ohms/square). The equivalent series resistance (ESR) of the capacitor, which depends on the sheet resistance, contributes to capacitor losses. While lower values of the ESR can be easily attained by increasing the conductivity of the electrodes (which can be done by increasing electrode thickness, for example), the thicker electrodes result in poor self-healing properties. The approach chosen for the purposes of the present disclosure is rooted, at least in part, in a judicious choice of the capacitor's geometry and is devoid of an overall increase of the thickness of the electrodes across the capacitor.

Figure 5A:
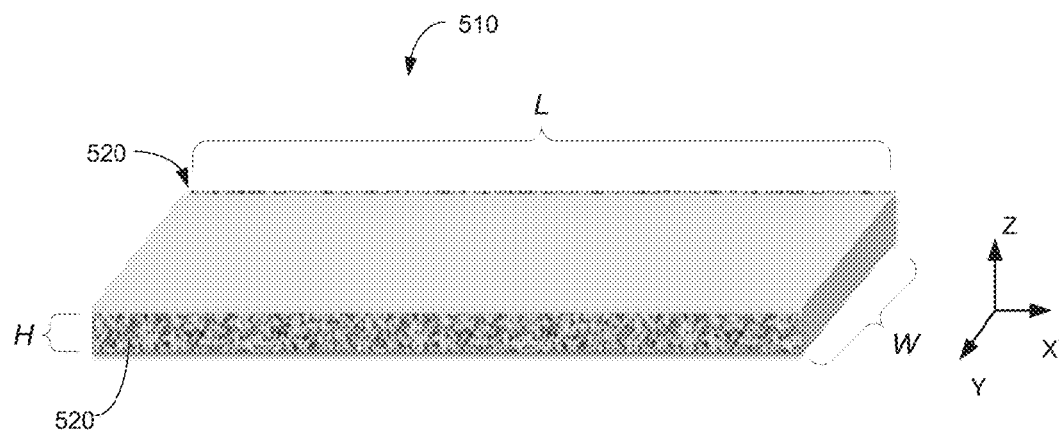
FIGS. 5A, 5B, 5C, 5D provide schematic diagrams illustrating embodiments of polymer capacitors.
Figure 5B:
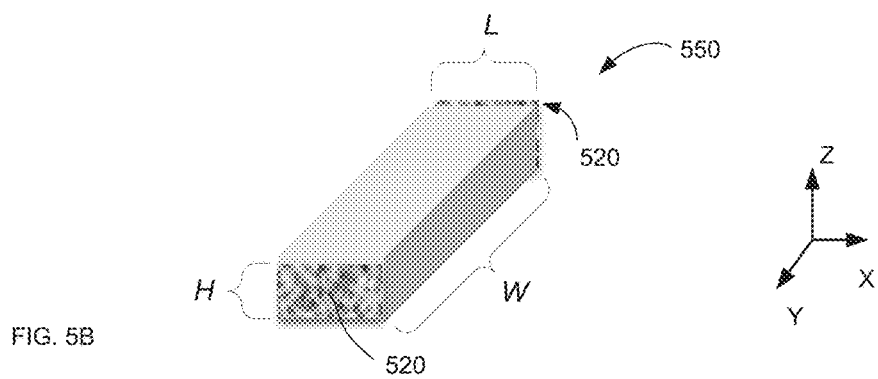
Figure 5D:
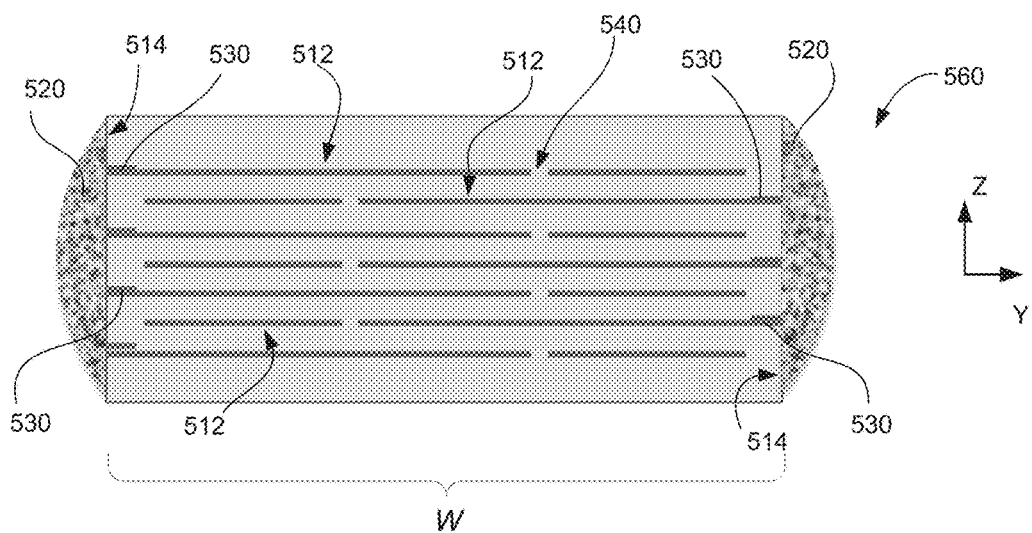
Figure 5C:
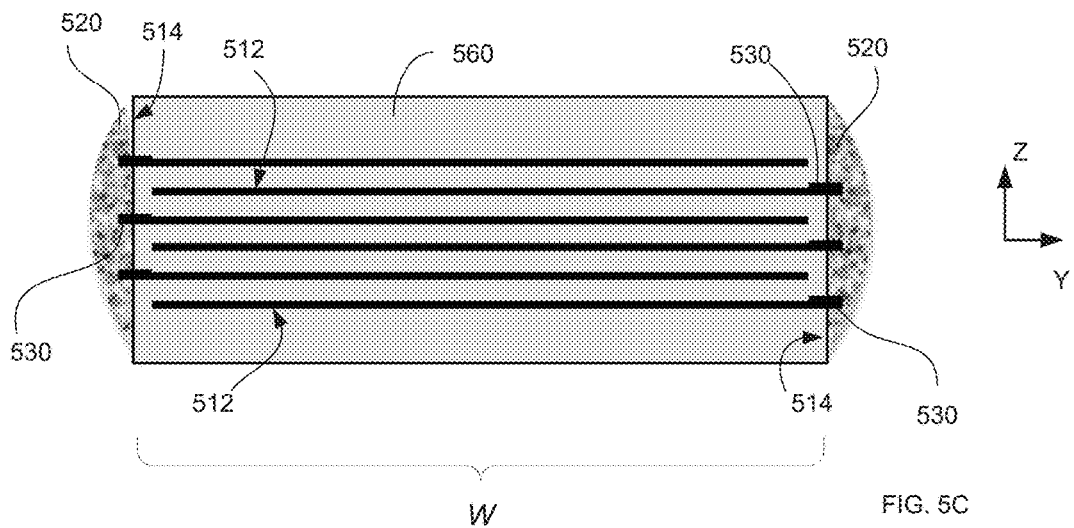

We discovered that in applications that involve AC current (such as high-frequency ripple current in a switching circuit), high resistivity increases the capacitor equivalent series resistance (ESR), which leads to losses of power via $I^2R$ (where R denotes the ESR and I denotes the AC current). The resulting from the power losses increased heating of the capacitor, which by itself or in combination with high ambient temperatures, can lead to the capacitor failure. We determined that to minimize the thermal effects of the current while also maintaining the electrodes with higher levels of sheet resistance, which aids the self-healing process, the geometry of the capacitor must be chosen to reduce the capacitor's ESR as much as it is practical. This goal can be achieved by shaping the capacitor's body to be elongated, extended on one direction to a greater degree than in another, transverse direction, and establishing the termination structure at the long side of so-shaped capacitor. The higher the target value of the sheet resistance of the electrodes, the higher the ratio of the extent of the termination edge to that of the other edge has to be. For example, a 2000 layer capacitor shaped as a square (when viewed perpendicularly to the capacitor's layers) and that has electrodes with the sheet resistance of 50 ohms/square has an ESR at a resonance frequency of approximately 25-mohm. If the capacitor is five times as long along the termination side as it is wide, however, the ESR value drops to approximately five times to 5 mohm and so do the heating losses. FIGS. 5A, 5B, and 5C provide corresponding illustrations, of which FIGS. 5A, 5B show examples of two PMCs 510, 550 and FIG. 5C illustrates a not-to-scale cross-section of any of the capacitors 510, 550. Each of the capacitors 510, 550 includes thousands of capacitor layers 512 shown in FIG. 5C. Multiple layers 512 are connected at the termination facets 514 of the structures by termination coating 520, such as electric arc spray, which shorts the electrode layers together and establishes a contact point to charge and discharge the capacitor. In order to improve the mechanical strength and reduce the contact resistance of the structure of a PMC, the electrodes 512 are configured to have heavy edges 530, outside the active capacitor area and in proximity to the termination coating 520, so that the thicker edge-portion of an individual electrode layer does not affect the capacitor self-healing properties. It was discovered that in order to maximize the capacitor self-healing process (which requires the use of electrodes with higher sheet resistance values while also minimizing the impact of the higher sheet resistance on the ESR), the general geometry and the ratio L/W of the PMC devised according to an embodiment of the invention should follow that of capacitor 510 where L/W≥1 and preferably L/W>2.

In one implementation, such geometry is achieved, simultaneously with increasing the capacitor voltage and without resorting to capacitor shapes that are not practical, by connecting electrodes in series internally to the PMC structure. This is illustrated schematically in the example of FIG. 5D, in which the embodiment of the capacitor of the invention is shown to contain three internal sections of electrodes in series 540, which effectively increases the L/W ratio of each of the three sub-capacitor structures by a factor of three as compared to the case shown in FIG. 5C, which is devoid of such serial connections. It should also be noted that in order to protect the PMC from damage during handling, additional protective dielectric layers 550 are deposited on both sides of the mother capacitor material.

In order to practice the invention and produce a PMC that can reliably function at temperatures as high as at least 125° C., the capacitor electrodes must be passivated. A mechanism leading to potential failure of all metallized film capacitors includes excessive capacitance loss during the lifetime of the capacitor in an environment with high temperature and high humidity. Typically, in most applications, if the loss of capacitance exceeds about 5% to 10%, the capacitor is considered to have failed.

Two different methods for minimizing such corrosion mechanism have been devised according to embodiments of the invention. One such method stems from discovery that when PMC is heated above a certain temperature (and, specifically, temperatures in the range of 200° C. to 280° C.) organometallic bonds are formed between the surface of the metal electrodes and the polymer dielectrics, resulting in blocking access of water to the metal of the electrodes. Because the metal electrode is formed in the vacuum in the absence of an oxidizing gas, the highly reactive surface of an electrode (made of aluminum, zinc or other metal) can be forced to react with the polymer or residual monomer in the already-formed polymer dielectric material of the PMC. The organometallic bonds on the electrode surface block molecules of water from reaching the surface and thus increase the corrosion resistance of the electrodes. For example, a PMC capacitor produced using two thousand layers of hexane diol diacrylate radiation-cured monomer, when placed in an accelerated corrosion test chamber at 125° C. and 30 psi of steam for one hour, exhibits full corrosion of the electrodes, as a result of which most of the originally metal-electrode surface turns into the transparent aluminum oxide.

Advantageously, when the electrodes of the PMC fabricated according to an embodiment of the invention were baked in the same chamber at 260° C. for six hours, the capacitor electrodes exhibited no apparent degradation. For capacitors employing different dielectric materials, the required passivation temperature may vary with polymer chemistry and time of exposure of the capacitor to the elevated temperature. It was empirically shown that for most radiation-cured polymer dielectric materials that can be used in an embodiment of the invention, passivation at 160° C. requires at least a six-to-seven day bake, while passivation at 200° C. reduces the duration of this process to 24 hours, and passivation at 240° C. requires only a 12 hour bake to achieve the desired results.

According to another implementation of the invention, the capacitor electrodes are passivated by exposing them to a oxidative plasma during the deposition process. The plasma may contain oxygen or other gasses than react with the electrode surface. When a metal electrode (such as an aluminum electrode, for example) deposited in the vacuum chamber is exposed to an oxygen-containing gas in the chamber, a high-quality $Al_2O_3$ oxide is formed on its surface, which is superior to the hydrated oxide ($Al_2O_3.(H_2O)$), that is formed upon exposure of the metal surface to air (containing both oxygen and moisture). In related embodiments, different plasma gases have been successfully used for this process including $O_2$, Ar, $CO_2$, $N_2$ and $N_2O$ and mixtures thereof.

Yet another method for enhancing the electrode passivation was discovered by exposing the polymer dielectric layer of the capacitor, prior to the deposition of the electrode layer thereon, to a plasma containing an oxidizing gas. The oxidizing gas was shown to create functional groups on the surface of the polymer (such as carboxyl and hydroxyl groups, for example) that react with the metal of the electrode layer and aid the passivation process.

Figure 6A:
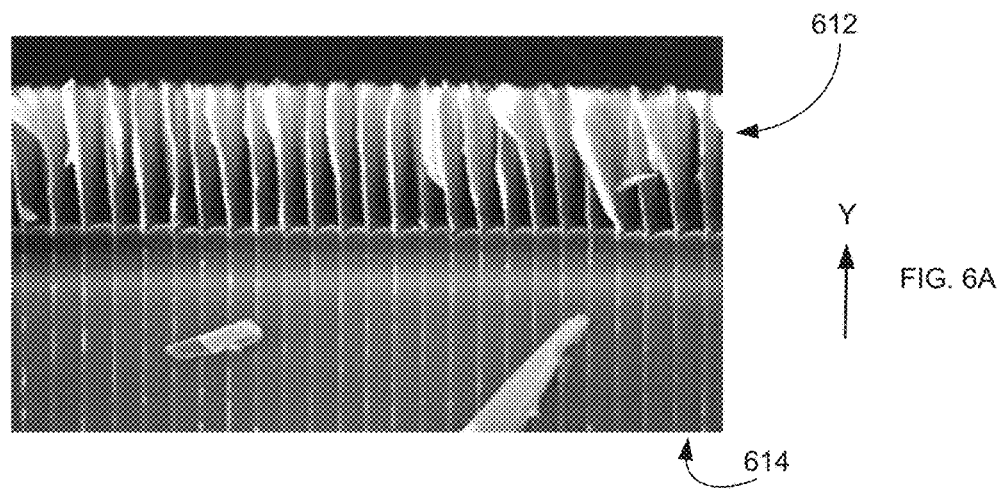
FIGS. 6A, 6B, 6C show images obtained with the use of SEM and illustrating the electrical termination edge of polymer monolithic capacitors prior to the application of the termination coating.

Notably, one of the questions accompanying the fabrication of a reliable PMC is how to establish a reliable and mechanically strong electrical contact with the individual electrode layers of the PMC structure (such as the electrodes 512 of the embodiments of FIGS. 5C and 5D), in which thin capacitor electrodes 512 are intentionally equipped with "heavy edges" 530 that are shorted together by the layer 520. In order to effectively short the heavy edges 530 together, the polymer at the capacitor edge is removed by plasma-ashing as shown in the SEM-derived view of a terminating edge surface in FIG. 6A. The length of the exposed portions 612 of the individual electrodes varies with the capacitor design and thickness of the dielectric material 614 between the electrodes. After exposing portions 612 of the electrodes, connecting the electrodes together can be effectuated, for example, by arc-spraying the exposed portions 612 with one of more layers of metal (such as aluminum, zinc, brass, solder or a combination thereof, to name just a few) depending on the particular application and the manner in which leads are attached to the sprayed termination. The resulting termination is adequate for most applications, but for surface-mount applications the arc-sprayed termination may be additionally coated with a conductive epoxy and then arc-sprayed again and plated with a solderable coating. The conductive epoxy acts as a thermomechanical shock absorber to facilitate thermal expansion and contraction of the structure on a printed circuit board without damaging the capacitor termination.

Figure 6B:
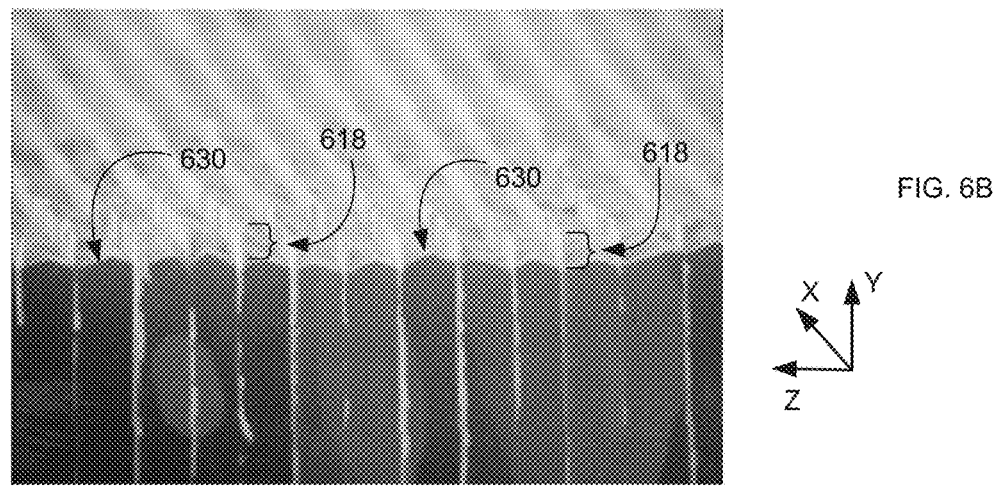
Figure 6C:
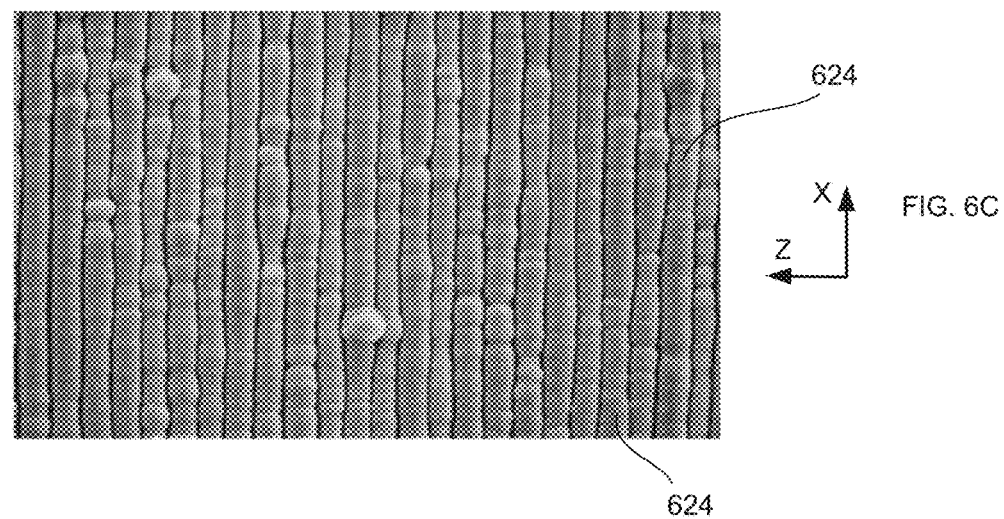

In a related embodiment, an alternative termination method has been developed, according to which plasma-ashing was performed to expose a controlled length 618 of a heavy edge 530 as shown in the SEM-captured cross-section in FIG. 6B. The so-exposed portions 618 of the electrodes were then coated with a multilayer sputtering coating 624 shown in FIG. 6C. The multilayer sputtered coating 624 acts to bond itself to the exposed portions 618 of the (aluminum) electrodes and the exposed surface 630 of the polymer dielectric material separating the portions 618, as well as to the material used at the following processing step. This step varies depending on the application, and may include soldering of the sputtered electrodes (when the sputtered coating includes copper, for example), or coating the sputtered electrodes with a conductive epoxy, which is arc-sprayed and then metal-plated.

Additional processing steps may be optionally performed in producing the capacitors according to an embodiment of the invention. Some of these processes have been referenced by the related art (see, for example, U.S. Pat. No. 5,018,048; U.S. Pat. No. 5,716,532; and U.S. Pat. No. 6,092,269, the disclosure of each of which is incorporated herein by reference), including creating demetallization zones (such as the ones used for the internal series connections using shadow masking or oil-vapor masking; cutting the mother capacitor material; etching the exposed edge of the individual capacitor to prevent flashover at higher voltages; including protective layers (that may include metallized and polymer only layers for example) on the bottom and top of the capacitor stack, lead attach, and packaging of the resulting structure, to name just a few.

The present application addresses a PMC containing a polymer dielectric material that possesses self-healing properties superior to those of a conventional PMC. The embodiments of the present invention are configured to operate at temperatures of 125° C. and higher while maintaining a stable dissipation factor across the range of operating temperatures, and possess corrosion-resistant electrodes. The polymer dielectric material of these polymer monolithic capacitors is characterized by a glass transition temperature that is higher than the chosen operating temperature, contributing to a stable dissipation factor and reduced moisture absorption. Such choice of a glass-transition temperature, combined with a prismatic capacitor shape (that has a specific length to width ratio) results in a PMC uniquely qualified to service high temperature switching applications that combine DC voltage with high frequency ripple currents The fabrication of a single PMC with the use of the solutions outlined above yields a capacitor having superior performance and durability, in comparison with a metallized polypropylene capacitor of the related art, when used under conditions typical for under-the-hood automotive applications.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It will be readily apparent to those skilled in this art that various changes and modifications of an obvious nature may be made, and all such changes and modifications are considered to fall within the scope of the present invention.

The invention claimed is:

1. A polymeric monolithic capacitor formed in the vacuum, the capacitor comprising:
multiple polymer dielectric layers, and
multiple metallized electrode layers, each having a heavy edge,
wherein at least one polymer dielectric layer comprises a chemical structure with a hydrogen-to-carbon ratio of at least 1.0 and an oxygen-to-carbon ratio of at least 0.1,
wherein at least one metallized electrode layer has a sheet resistance value between about 10 ohm/square and 100 ohm/square in the active capacitor area, and
wherein said capacitor is characterized by a dissipation factor that is greater than 0.02 at 25° C.

2. The polymeric monolithic capacitor of claim 1, wherein said at least one polymer dielectric layer has a chemical structure with a hydrogen-to-carbon ratio of at least 1.2.

3. The polymeric monolithic capacitor of claim 1, wherein said at least one polymer dielectric layer has a glass transition temperature greater than 100° C.

4. The polymeric monolithic capacitor of claim 1, wherein a metallized electrode layer has a heavy edge with a sheet resistance value smaller than 10 ohm/square.

5. The polymeric monolithic capacitor of claim 1, wherein a metallized electrode layer has a heavy edge with a sheet resistance value smaller than 5 ohm/square.

6. The polymeric monolithic capacitor of claim 1, wherein a glass transition temperature is lower than 100° C.

7. The polymeric monolithic capacitor of claim 1, comprising two or more internal electrical connections configured in series.

8. The polymeric monolithic capacitor of claim 1, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

9. The polymeric monolithic capacitor of claim 8, wherein said ratio is greater than 2.

10. An article of manufacture that includes the polymeric monolithic capacitor of claim 1.

11. A polymeric monolithic capacitor formed in the vacuum, the capacitor comprising:
multiple polymer dielectric layers, and
multiple metallized electrode layers, each having a heavy edge;
wherein a polymer dielectric layer comprises a chemical structure with a hydrogen-to-carbon ratio of at least 1.0 and an oxygen-to-carbon ratio of at least 0.1,
wherein said capacitor has a dissipation factor that is smaller than 0.02 at a temperature greater than 140° C.; and
wherein at least one metallized electrode layer has a sheet resistance in the range from about 10 ohm/square to about 100 ohm/square in the active capacitor area.

12. The polymeric monolithic capacitor of claim 11, wherein each of said multiple polymer dielectric layers includes a chemical structure with a hydrogen-to-carbon ratio of at least 1.0 and an oxygen-to-carbon ratio of at least 0.1.

13. The polymer monolithic capacitor of claim 11, wherein the dissipation factor is smaller than 0.01 at the temperature exceeding 140° C.

14. The polymeric monolithic capacitor of claim 11, wherein a metallized electrode layer has a heavy edge with a sheet resistance value smaller than 10 ohm/square.

15. The polymeric monolithic capacitor of claim 11, wherein a metallized electrode layer has a heavy edge with a sheet resistance value smaller than 5 ohm/square.

16. The polymeric monolithic capacitor of claim 11, wherein a polymer dielectric layer has a glass transition temperature greater than 100° C.

17. The polymeric monolithic capacitor of claim 11, wherein a polymer dielectric layer has a glass transition temperature greater than 140° C.

18. The polymeric monolithic capacitor of claim 10, comprising two or more internal electrical connections configured in series.

19. The polymeric monolithic capacitor of claim 11, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

20. The polymeric monolithic capacitor of claim 19, wherein said ratio is greater than 2.

21. An article of manufacture that includes the polymer monolithic capacitor of claim 11.

22. A polymeric monolithic capacitor formed in the vacuum, the capacitor comprising:
multiple polymer dielectric layers, and
multiple metallized electrode layers, each having a heavy edge,
wherein at least one polymer dielectric layer comprises a chemical structure with a hydrogen-to-carbon ratio of at least 1.0 and an oxygen-to-carbon ratio of at least 0.1,
wherein at least one metallized electrode layer has a sheet resistance value between about 10 ohm/square and 100 ohm/square in the active capacitor area, and
wherein a glass transition temperature is less than 100° C.

23. The polymeric monolithic capacitor of claim 22, wherein said at least one polymer dielectric layer has a chemical structure with a hydrogen-to-carbon ratio of at least 1.2.

24. The polymeric monolithic capacitor of claim 22, wherein said at least one polymer dielectric layer has a glass transition temperature greater than 100° C.

25. The polymeric monolithic capacitor of claim 22, wherein a metallized electrode layer has a heavy edge with a sheet resistance value smaller than 10 ohm/square.

26. The polymeric monolithic capacitor of claim 22, wherein a metallized electrode layer has a heavy edge with a sheet resistance value smaller than 5 ohm/square.

27. The polymeric monolithic capacitor of claim 22, characterized by a dissipation factor that is greater than 0.02 at 25° C.

28. The polymeric monolithic capacitor of claim 22, wherein a glass transition temperature is lower than 100° C.

29. The polymeric monolithic capacitor of claim 22, comprising two or more internal electrical connections configured in series.

30. The polymeric monolithic capacitor of claim 22, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

31. The polymeric monolithic capacitor of claim 30, wherein said ratio is greater than 2.

32. An article of manufacture that includes the polymeric monolithic capacitor of claim 22.

* * * * *